United States Patent [19]
Reed et al.

[11] Patent Number: 5,659,002
[45] Date of Patent: Aug. 19, 1997

[54] MODIFIED TANNIN MANNICH POLYMERS

[75] Inventors: Peter E. Reed, Plainfield, Ill.; Martha R. Finck, Aix-En Provence, France

[73] Assignee: Nalco Chemical Company, Naperville, Ill.

[21] Appl. No.: 409,396

[22] Filed: Mar. 24, 1995

[51] Int. Cl.$^6$ ................... C08G 8/04; C02F 1/56
[52] U.S. Cl. .............. 528/129; 528/162; 528/212; 528/219; 528/230; 528/232; 210/723; 210/728; 210/730; 210/736
[58] Field of Search ............ 525/54.4; 528/129, 528/212, 219, 162, 230, 232; 210/723, 728, 730, 736

[56] References Cited

U.S. PATENT DOCUMENTS 4,558,080 12/1985 Quamme et al. ................ 524/72

*Primary Examiner*—Mark L. Warzel
*Attorney, Agent, or Firm*—James J. Drake; Robert A. Miller; Patricia A. Charlier

[57] ABSTRACT

The invention is a process for preparing alkylated tannin Mannich polymers by reacting a tannin Mannich condensation polymer, prepared from a condensed tannin, and amine, and formaldehyde, with an alkylating agent at a pH between 5 and 14. Optionally, the alkylated tannin Mannich polymer may be reacted further with formaldehyde to increase its viscosity.

The invention further comprises a method of removing color form waste water utilizing the alkylated tannin Mannich polymer produced by the above process.

14 Claims, No Drawings

MODIFIED TANNIN MANNICH POLYMERS

BACKGROUND OF THE INVENTION

1. Field of the Invention

The invention relates to a process for synthesizing alkylated tannin Mannich polymers and the use of these polymers in a process for removing color contaminants from waste water.

2. Description of the Prior Art

The removal of color from the effluent streams of papermills continues to be a problem within the pulp and paper industry. It is necessary that these downstream waste waters be treated for color removal prior to discharge into public water ways. Increasingly, there has been concern about the possible toxic effects of colored waste discharge water causing reduced levels of oxygen concentration in effluent waters, and creating oxidation products which may be potentially harmful. Prior art solutions to the color removal problem have included the use of tannin based flocculant compounds.

Tannins are plant extracts that can be subdivided into two types, hydrolyzable and condensed, based on their structure. Hydrolyzable tannin extracts are comprised of relatively low molecular weight compounds comprised of esters of a sugar with trihydroxybenzenecarboxylic acids. Condensed tannin extracts are a complex mixture comprised of about 70% polyflavinoids. Formula 1 shows the structure of the main flavinoid unit present in wattle tannin, a mimosa bark extract. This flavinoid is thought to form two to eleven-unit oligomers by self-condensation at positions 4 and 6 to give wattle tannin, which possesses a number average molecular weight of 1250.

FORMULA 1

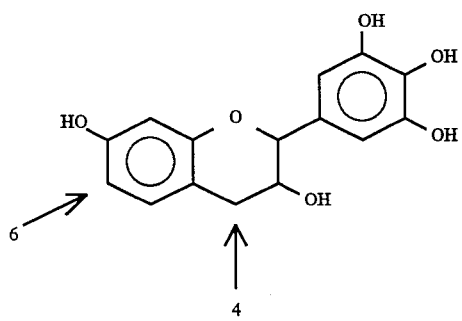

Tannins also undergo Mannich aminomethylation by reaction with an aldehyde and an amine. The resulting "tannin Mannich" polymer possesses a higher molecular weight due to formaldehyde and Mannich base crosslinking, and also possesses ampholytic character due to the presence of both cationic amines and anionic phenols on the polymers. As a result of their ampholytic nature, tannin Mannich polymers are highly water soluble at extreme pH's, but are often insoluble at pH's near 7 because this is near their isoelectric point (where the net charge on the polymer is zero). Tannin Mannich polymers continue to crosslink upon storage until they eventually form an insoluble gel. This continual crosslinking limits their shelf life to about three months.

Tannin Mannich polymers have been used in South Africa for many years as a flocculant for clay suspensions in municipal water treatment. In North America, Dearborn Chemical Company sells a "Klar-Aid®"series of tannin Mannich polymers for water clarification. Tannin-based materials have also been claimed for other water treatment applications. The mechanism by which tannin Mannichs are presumed to work for water clarification relies upon their relative insolubility at neutral pH, which causes them to self-flocculate and sweep other suspended particulates out of the water as they settle.

Representative tannin Mannich polymers include those produced according to the process disclosed in U.S. Pat. No. 4,558,080, (the Dearborn process) the disclosure of which is incorporated herein by reference. Unfortunately, the use of these color removal compounds is limited with respect to the pH range of waste water with which they may be used. Tannin Mannich polymers do not perform well for color removal from kraft papermill waste streams unless the pH of the waste stream can be lowered. Under these conditions, colors are removed effectively, but high doses of the polymer are required.

Desirably, a compound which can effectively remove color from waste water effluent streams and which is effective within a wide range of pH would exist.

SUMMARY OF THE INVENTION

The invention is a process for preparing alkylated tannin Mannich polymers comprising adding tannin to soft water to form a smooth mixture, stirring the mixture until all solids have dissolved and adding ethanolamine to the mixture until a the temperature of 350° to 40° C. is reached. Once the temperature is reached, formaldehyde is added to the mixture followed by the addition of hydrochloric acid to balance the pH of the mixture. Once the pH has been balanced, soft water and sodium methyl bisulfite is added to the mixture to increase its viscosity. The mixture is then cooled and diluted. Finally, the mixture is reacted with methylchloride to increase the viscosity sufficiently to form a compound suitable for use in removing color from waste water.

The invention further comprises a method of removing color from waste water utilizing the alkylated tannin Mannich polymer produced by the above process.

DESCRIPTION OF THE PREFERRED EMBODIMENTS

Synthesis of the claimed alkylated tannin Mannich polymer is achieved according to a process comprising the reaction of a conventional tannin Mannich condensation polymer with an alkylating agent at a pH between 5 and 14 and at temperatures between 30° and 100° C. for a period of 0.5 to 12 hours. The tannin Mannich condensation polymer used as the substrate for the alkylation reaction can be prepared by the reaction of a condensed tannin with an amine and an aldehyde according to known methods. One such method is described in U.S. Pat. No. 4,558,080, the disclosure of which is incorporated herein by reference where a tannin, an amino compound, and an aldehyde were combined in a specific ratio and allowed to react under slightly acidic conditions at a temperature of 150° to 200° F. until a predetermined viscosity was reached, and then pH-adjusted to a value below 3 in order to stabilize the product.

Although tannin Mannich condensation polymers prepared under a variety of reaction conditions are suitable for use in the present invention, tannin Mannich polymers prepared under certain reaction conditions are preferable for use as substrates for the alkylation reaction. For the present invention, the alkylation reaction is easier to perform if the tannin Mannich condensation polymer is prepared at a pH close to the preferred pH of the alkylation reaction. Thus, the preferred pH range for the preparation of the tannin Mannich substrate is from about 6 to about 9. In addition, it is preferable to conduct the alkylation reaction immediately after the tannin Mannich substrate is formed, by eliminating the final pH-lowering step of the tannin Mannich preparation and, instead, adding the alkylating agent directly to the tannin Mannich condensation polymer at the higher reaction pH. Finally, the alkylation reaction provides maximum benefit if the tannin Mannich substrate contains a relatively large amount of amine groups on the polymer. The preferred molar ratio of amino compound to the tannin repeating unit in the tannin Mannich substrate is from about 1 to about 5.

The alkylation reaction which produces the polymers of the present invention is carried out by reacting the tannin Mannich condensation polymer substrate with an alkylating agent in order to alkylate some of the amine groups on the tannin Mannich polymer. Suitable alkylating agents include dimethyl sulfate, methyl iodide, methyl chloride, or other alkyl halides containing one to ten carbons. The preferred alkylating agent is methyl chloride, because of its relatively low toxicity and low cost. The alkylation reaction is conducted at a temperature between 30° and 100° C., and the preferred reaction pH is between 6 and 11. In general, the reaction conditions will need to be optimized for a specific polymer and alkylating agent combination. If the temperature and pH for a specific polymer/alkylating agent combination are too high, the alkylating agent may decompose by hydrolysis at a rate sufficient to interfere with the alkylation reaction. If the temperature and pH for a specific polymer/alkylating agent combination are too low, the reactivity of the amine towards the alkylating agent may be too low to allow for the reaction to proceed within a reasonable period of time. The reaction time is between about 0.5 and about 12 hours. Preferably, the reaction time is between one and six hours.

In general, the performance of the alkylated tannin Mannich polymers is expected to improve as the polymer molecular weight is increased, provided that the polymer remains stable and water-soluble. Preferably, the molecular weight of the alkylated tannin Mannich polymer is high enough so that the bulk viscosity of the final polymer at 29 wt. % solids is above 100 cps, as measured using a Brookfield viscometer with a #2 spindle at 60 rpm. In daltons, the molecular weight of the preferred polymer is from about 50,000 to about 10,000,000. If the viscosity of the alkylated tannin Mannich polymer of the present invention is below 100 cps, the viscosity can be increased by further reaction of the polymer with formaldehyde at low pH.

EXAMPLE 1

In this example, a tannin Mannich condensation polymer is produced in order to serve as a substrate for the subsequent alkylation reaction, and in order to serve as a comparative example for the evaluation of alkylated tannin Mannich condensation polymers.

To a one liter reactor was added 84.6 g deionized water and 0.1 g Dow Anitifoam A. With rapid stirring, 73.4 g Wattle tannin was slowly added and the resulting mixture was allowed to stir for 30 minutes to facilitate the dissolution of the tannin. Ethanolamine, 54.2 g. was then added over 15 minutes at such a rate that the reaction temperature did not exceed 40° C. Formaldehyde, 71.3 g of a 37% aqueous solution, was then added over 30 minutes at such a rate that the reaction temperature did not exceed 65° C. After stirring for 15 minutes, the reaction pH was adjusted to 7.5 by the slow and careful addition of hydrochloric acid (about 20 g of a 38% aqueous solution), and the reaction mixture was then heated to 75° C. and stirred for 3 hours. The reaction was then continued until an aliquot of the reaction mixture, adjusted to pH 2–3 with concentrated hydrochloric acid, possessed a viscosity greater than 125 centipoise, as measured using a Brookfield viscometer with a #2 spindle at 60 rpm. At this point, the reaction product, existing as a suspension of tannin Mannich condensation polymer in water possessing a pH of 7.2, was diluted with deionized water to 29 wt. % total solids. If desired, the product could be made homogeneous by lowering the pH to below three with concentrated hydrochloric acid.

EXAMPLE 2

In this example, a alkylated tannin Mannich polymer is prepared using the condensation polymer prepared in Example 1 as the tannin Mannich substrate and methyl iodide as the alkylating agent. To a 500 mL glass roundbottom flask fitted with a reflux condenser was added 100.0 g of a suspension of tannin Mannich polymer in water (29 wt. %, pH 7.2), cetyl trimethylammonium bromide (0.1 g), Dow Anitfoam A (0.1 g), and methyl iodide (24.0 g). The mixture was stirred and heated in a water bath at 45° C. for four hours, during which time the pH dropped to 5, 8 and the methyl iodide phase reduced in volume. Unreacted methyl iodide was then removed by distillation and nitrogen purge to give a dark, homogeneous, 42 wt. % solution of the methyl iodide-alkylated tannin Mannich polymer.

EXAMPLE 3

In this Example, a partially alkylated tannin Mannich polymer is prepared using the condensation polymer prepared in Example 1 as the tannin Mannich substrate and a small amount of methyl chloride as the alkylating agent. To a 300 mL Parr pressure reactor was added 90.0 g of a suspension of tannin Mannich polymer in water (29 wt. %, pH 7.2). The reactor contents were sealed and heated to 65° C. with stirring, and then 0.63 g methyl chloride was charged to the reactor. After 1 hour, the reaction product was removed from the Parr reactor and placed in a glass roundbottom reactor. The alkylated tannin Mannich quat product was then adjusted to pH 2 with 5.6 g concentrated hydrochloric acid, and 0.5 g of a 37% solution of formaldehyde was added. The solution was then stirred and heated to 60° C. for 30 minutes, until the viscosity of the reaction solution exceeded 100 cps. The product was then diluted with deionized water to gives a 20 wt.% solution of partially alkylated tannin Mannich polymer.

EXAMPLE 4

In this Example, alkylated tannin Mannich polymer is prepared as in Example 3, except that a larger amount of methyl chloride and a longer reaction time are used in order to more completely alkylate the polymer, and the product is not post-treated with formaldehyde to increase its viscosity. To a 300 mL Parr pressure reactor was added 90.0 g of a suspension of tannin Mannich polymer in water (29 wt. %, pH 7.2). The reactor contents were sealed and heated to 65° C. with stirring, and then 9.2 methyl chloride was charged to the reactor. After 8 hours, the now homogeneous reaction product was removed from the Parr reactor, adjusted to pH 2.5 with 1.8 g concentrated hydrochloric acid, and concentrated under reduced pressure to 45 wt. % solids. The Brookfield viscosity of the polymer was determined to be 146 cps.

EXAMPLE 5

In this Example, the polymer charge densities of the methyl chloride-alkylated tannin Mannich polymers are measured by colloid titration and compared to the charge densities of the tannin Mannich precursor polymer. Polymer charge densities were measured at pH 3 and pH 6 using a method based on that of Terayama (J. Polym. Sci., vol. 8, p. 243, 1952). At pH three, the charge density data allow an estimation of the relative amount of total amount of amine incorporated into the polymer, since almost all of the amine groups present on the polymer will possess a positive charge at this pH. At pH six, the charge density data give an indication the relative extent of alkylation of the polymer, since a large proportion unalkylated amine groups will not possess a positive charge at this pH, but alkylated, alkylated amine groups on the polymer will be expected to possess a positive charge at this pH. The results are shown in Table I for the tannin Mannich condensation polymer prepared according the Example 1 (Polymer A) and the methyl chloride-alkylated polymers prepared according to Example 3 (Polymer C) and Example 4 (Polymer D). Alkylation (and presumably quaternization) of the process polymers was successful, as indicated by the increasing charge density at pH six between the unalkylated Polymer A, the partially alkylated Polymer C, and the exhaustively alkylated Polymer D.

conventional tannin Mannich precursor polymer prepared by the method described in Example I (Polymer A) did not form floes or remove color in this experiment. The performance of these polymers parallels the polymer charge densities shown in Table I, and illustrates the advantages provided by the present invention for removing color from kraft paper mill waste water.

Changes can be made in the composition, operation and arrangement of the method of the present invention described herein without departing from the concept and scope of the invention as defined in the following claims:

We claim:

1. A method of alkylating a tannin Mannich condensation polymer comprising the step of reacting the tannin Mannich polymer with an alkylating agent to produce a quaternized alkylated tannin Mannich condensation polymer.

2. The method of claim 1 wherein the alkylating agent is selected from the group consisting of dimethyl sulfate and an alkyl halide selected from the group consisting of chlorides and bromides.

3. The method of claim 1 wherein the alkylating agent has from 1 to 20 carbons.

TABLE I

Charge Density Comparison

| SAMPLE | ALKYLATION LEVEL | CHARGE DENSITY pH 3 (meq/g) | CHARGE DENSITY pH 6 (meq/g) |
| --- | --- | --- | --- |
| Polymer A | unalkylated | — | 0.429 |
| Polymer C | partially alkylated | 1.64 | 0.658 |
| Polymer D | exhaustively alkylated | 1.95 | 1.36 |

EXAMPLE 6

In this Example, the alkylated tannin Mannich polymer prepared by the method described in Example 2 (Polymer B) is compared to the conventional tannin Mannich polymer prepared by the method described in Example 1 (Polymer A) for the removal of color from a kraft paper mill waste stream. Testing of the polymer samples was undertaken using a fresh sample of primary paper mill waste water possessing a pH of 9.6. True color was determined after dosing according to the method described in The National Council of Air and Stream Improvement Technical Bulletin No. 253. At the unadjusted pH of 9.6, only Polymer B, of the present invention, was capable of forming flocs and removing color from the waste water. The results for Polymer B are shown in FIG. 1. The conventional tannin Mannich polymer, Polymer A, did not form flocs or reduce the color form the waste water at the unadjusted pH of 9.6. Polymer A could be made to form flocs only if the pH of the waste water was lowered to 8.

EXAMPLE 7

In this Example, alkylated tannin Mannich polymers possessing different levels of alkylation were tested for the removal of color from a kraft paper mill waste stream. The polymers were tested using a fresh sample of primary paper mill waste water processing a pH of 9.8 and a true color of 1070 Pt. Co. units. The results are shown in FIG. 2, where it can be seen that a positive relationship exists between color removal performance (FIG. 2) and charge density at pH six (Table I). In FIG. 2, the best performance is seen for the exhaustively alkylated tannin Mannich polymer prepared by the method described in Example 4 (Polymer D). The partially alkylated tannin Mannich polymer prepared by the method described in Example 3 (Polymer C) shows poorer performance for color removal when compared to the exhaustively alkylated Polymer D (FIG. 2). The unalkylated, 4. The method of claim 2 wherein the alkyl halide comprises methyl chloride.

5. An improved process for removing color from waste water, which comprises treating the waste water with a alkylated tannin Mannich polymer which is capable of forming a complex with the color-forming components of the waste water;

forming a complex; and removing the color.

6. The process of claim 5, wherein the pH of the waste water is in the range between 6.0 to 13.0.

7. The process of claim 6, wherein the pH of the waste water is in the range between 8.0 to 12.0.

8. The process of claim 7, wherein the pH of the waste water is in the range between 9.0 to 11.0.

9. The process of claim 5, wherein the alkylated tannin Mannich polymer is added to the waste water in an amount between about 1 to about 1000 parts per million.

10. The process of claim 5, wherein the step of removing the solids from the waste water is selected from the group consisting of coagulation, flocculation, filtration, sedimentation plus filtration, and air flotation clarification.

11. The process of claim 1, wherein the tannin is selected from the group consisting of wattle and quebracho.

12. The process of claim 2, wherein the alkylated tannin Mannich polymer has a molecular weight of from about 50,000 to about 10,000,000 daltons.

13. A quaternized alkylated tannin Mannich condensation polymer having quaternary nitrogen functional groups, the polymer having greater than 0.5 millequivalents per gram of charge density.

14. The method of claim 1 further comprising the step of treating the quaternized alkylated tannin Mannich condensation polymer with a viscosifying amount of formaldehyde.

* * * * *